(12) United States Patent
Ho et al.

(10) Patent No.: US 7,936,199 B2
(45) Date of Patent: May 3, 2011

(54) APPARATUS AND METHOD FOR EXTERNAL TO INTERNAL CLOCK GENERATION

(75) Inventors: Michael V. Ho, Allen, TX (US); Tyler J. Gomm, Boise, ID (US); Scott E. Smith, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 12/027,124

(22) Filed: Feb. 6, 2008

(65) Prior Publication Data

US 2009/0195287 A1 Aug. 6, 2009

(51) Int. Cl.
*G06F 1/04* (2006.01)
*H03K 3/00* (2006.01)

(52) U.S. Cl. ........ 327/298; 327/165; 327/166; 327/261; 327/294

(58) Field of Classification Search .................. 327/165, 327/166, 291–299
See application file for complete search history.

(56) References Cited

U.S. PATENT DOCUMENTS

| 6,212,126 B1 * | 4/2001 | Sakamoto ................. 365/233.14 |
| 6,285,226 B1 * | 9/2001 | Nguyen ........................ 327/175 |
| 6,847,582 B2 * | 1/2005 | Pan ........................... 365/233.14 |
| 2007/0013422 A1 * | 1/2007 | Zhu et al. ...................... 327/172 |

* cited by examiner

*Primary Examiner* — Lincoln Donovan
*Assistant Examiner* — Brandon S Cole
(74) *Attorney, Agent, or Firm* — Schwegman, Lundberg & Woessner, P.A.

(57) ABSTRACT

A phase recombination circuit includes a first phase input and a first one-shot pulse generator adapted to receive the first phase input and produce a first signal to pull a signal to a first state. The phase recombination circuit also includes a second phase input in phase relationship with the first phase input, and a second one-shot pulse generator adapted to receive the second phase input and produce a second signal to pull a signal to a second state.

10 Claims, 8 Drawing Sheets

APPARATUS AND METHOD FOR EXTERNAL TO INTERNAL CLOCK GENERATION

TECHNICAL FIELD

Various embodiments described herein relate to apparatus, systems, and methods associated with information storage and processing, including the operation and manufacture of a method and apparatus for external to internal clock generation.

BACKGROUND INFORMATION

In synchronous integrated circuits, the integrated circuit is clocked by an external clock signal and performs operations at predetermined times relative to the rising and falling edges of the applied clock signal. Examples of synchronous integrated circuits include synchronous memory devices such as synchronous dynamic random access memories (SDRAMs), synchronous static random access memories (SSRAMs), and packetized memories like sync link dynamic tandem access memory (SLDRAMs) and rambus dynamic random access memory (RDRAMs). Double Data Rate (DDR, DDR2, DDR3), GDR (graphic), mobile DRAM or any device has DLL (for data output) and address setup and hold for both edges of the clock memory as well as other types of integrated circuits such as microprocessors. The timing of signals external to a synchronous memory device is determined by the external clock signal, and operations within the memory device typically have to be synchronized to external operations. For example, read data are placed on a data bus by the memory device in synchronism with an external clock signal. The memory device latches and drives the data onto the data bus at the proper times to successfully provide the read data. To latch the read data and drive it onto the data bus, an internal clock signal is developed in response to the external clock signal, and is typically applied to the data latches and data drivers contained in the memory device to thereby clock the data onto the data bus. The internal clock signal and external clock signal are synchronized to ensure the internal clock signal clocks the latches and data drivers at the proper times to successfully provide the read data. In the present description, "external" is used to refer to signals and operations outside of the memory device, and "internal" is used to refer to signals and operations within the memory device. Moreover, although the present description is directed to synchronous memory devices, the principles described herein are equally applicable to other types of synchronous integrated circuits.

Internal circuitry in the memory device that generates the internal clock signal necessarily introduces some time delay, causing the internal clock signal to be phase shifted relative to the external clock signal. As long as the phase shift is minimal, timing within the memory device can easily be synchronized to the external timing. To increase the rate at which commands can be applied and data can be transferred to and from the memory device, the frequency of the external clock signal is increased, and in modern synchronous memories the frequency may be well in excess of 500 MHz. It is contemplated that these frequencies will continue to increase. As the frequency of the external clock signal increases, however, the time delay introduced by the internal circuitry becomes more significant. This is true because as the frequency of the external clock signal increases, the period of the signal decreases and thus even small delays introduced by the internal circuitry correspond to significant phase shifts between the internal and external clock signals. As a result, the commands applied to the memory device may no longer be valid by the time the internal clock signal clocks the latches. Additionally, as the frequency of the external clock increases, variations in the duty cycle of the clock signal introduce a greater duty cycle error. In addition, time delay and phase shift are expected as signals propagate through internal circuitry. The variations of time delay and phase shift may be introduced by PVT (process-voltage-temperature) variations in extreme conditions. The clock signal is considered an analog input to the input buffer. At high frequencies and low VCC, the delay of the clock signal through the input buffer will vary and also the delay of the rising edge of clock versus the falling edge of clock will start to distort. When this happens, a single clock buffer will show duty cycle distortions on the output.

Low power applications also present clocking challenges. In many low power applications, lower frequency clocks may be used. Even though the clock runs at a lower frequency in these low power applications, the clock must operate at low voltages and low power. However, as the VCC associated with the low power components varies, it has been found that the duty cycle associated with the clocking signal may vary. In other words, with variations in VCC, the high time and low time of the clock signal may vary from the high time and low time of the external clock. As a result, duty cycle distortion may occur in the internal clock when compared to the external clock.

In some instances, a memory or other electronic component has a low pin count for outputs. Of course, memory holds data and a goal of storing memory is to maintain the integrity of the data. In order to get data out of a low pin count device more quickly, data from memory may be clocked out both on the rising clock edge and on the falling clock edge. In this type of application, the duty cycle is carefully maintained so that the data and commands are latched at an output and latched out of the memory and onto a data buffer at the correct time. If there is distortion in the duty cycle of the internal clock when compared to the external clock, the data placed onto the data bus may be incorrect, unreliable or lost. In any instance, the integrity of the data may be compromised.

Therefore, there is a need for a clock generator that functions in a variety of different types of circuits that reduces duty cycle distortion between an external clock and an internal clock.

DETAILED DESCRIPTION

Figure 1:
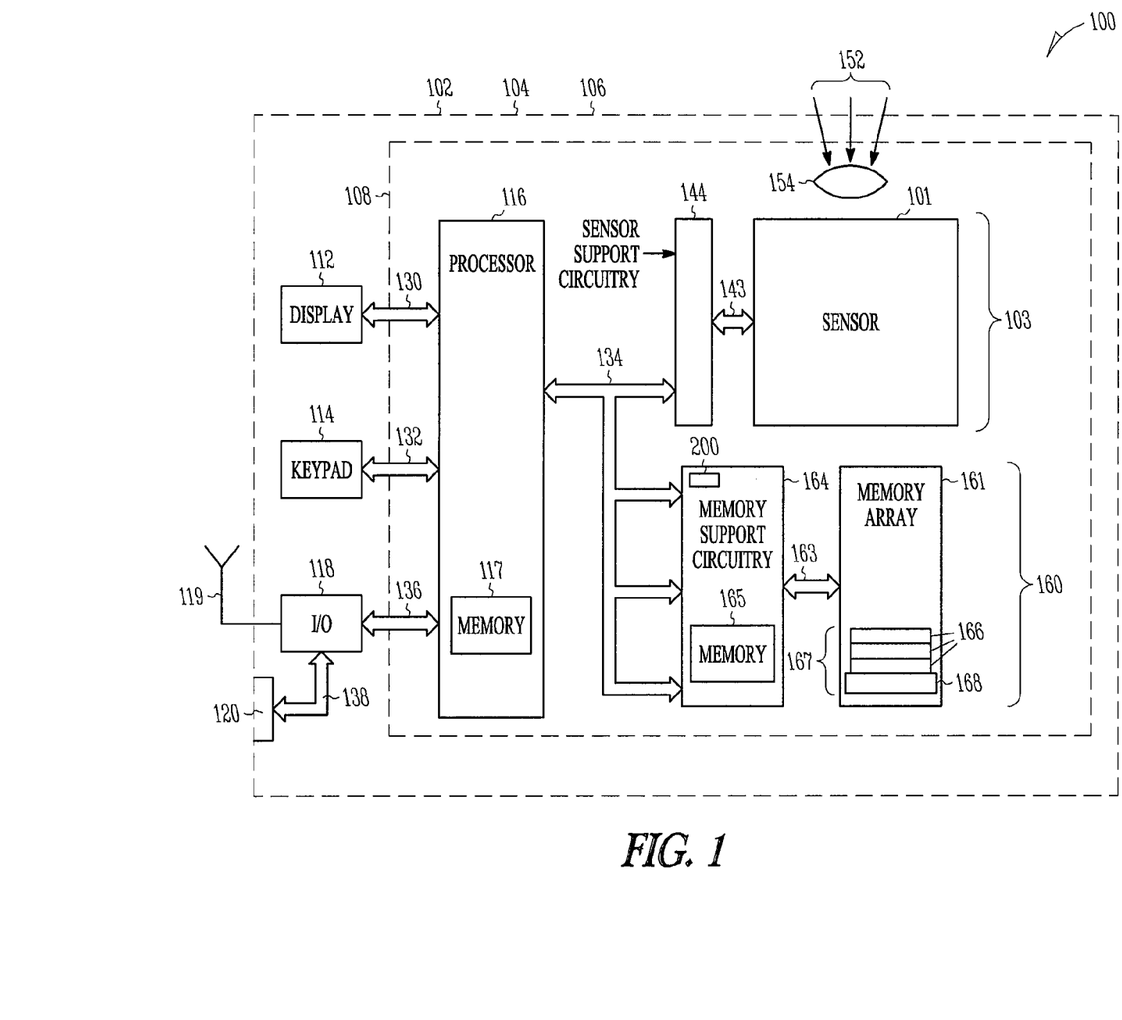
FIG. 1 is a schematic diagram of a system that uses an example embodiment of an internal clock.

FIG. 1 is a block diagram of an example system that uses an example embodiment of the invention. It should be noted that FIG. 1 is one example system that requires a device that makes many memory refreshes in short amounts of time. The example application is for a vision system. This example system is one application of an example embodiment and there are many other uses for the example embodiments described herein.

FIG. 1 includes a block diagram of a system 100 according to an embodiment. The system 100 includes a processor 116 and a memory device 160. Processor 116 is not limited to any particular type of processor. In one embodiment, the processor 116 may be formed on substrate 108 and includes a memory device 160 and an image sensor 103. The processor 116 includes memory 117. The memory 117 may be any type of memory, such as volatile memory, non-volatile memory, or cache memory. The memory 117 is used to store electronic signals provided by a sensor 101. In various embodiments, memory 117 may store a mapping table, an index table, or both a mapping table and an index table. In various embodiments, processor 116 may be coupled to a plurality of electronic circuits on substrate 108 through one or more interconnects, including interconnect 134, which is a bus.

The memory device 160 includes a memory array 161 coupled to memory support circuitry 164 though interconnect 163. Memory array 161 may include any type of memory array, such as non-volatile memory including NAND flash memory. The memory array 161 may be organized into a plurality of erase blocks. Support circuitry may include column address and row address decoder circuits, driver circuitry for writing data to and providing data outputs from the memory array 161, and interface circuitry to allow memory support circuitry 164 to process signals received and provided on interconnects 134 and 163. Memory support circuitry 164 may also include memory 165. The memory 165 can include a mapping table, an index table, or both a mapping table and an index table.

The image sensor 103 includes sensor 101 and sensor support circuitry 144. Image sensor 103 may be included in system 100 as part of a device such as a digital camera 102, a cell phone 104, or a video recorder 106, which may be used to capture video images. The system 100 includes a lens 154 to focus light 152 or other wavelengths of electromagnetic radiation onto the sensor 101 of the system 100. System 100 may include one or more electronic circuits provided on the substrate 108. In some embodiments, lens 154 is formed as part of the electronic circuits provided on substrate 108.

In some embodiments, sensor 101 includes a plurality of complementary metal-oxide semiconductor (CMOS) imaging sensors arranged in a series of rows and columns. Embodiments are not limited to a particular number of CMOS imaging sensors, or to a particular number of row or columns of such sensors. In some embodiments, sensor 101 may include more than a million CMOS imaging sensors. It is anticipated that the number of CMOS imaging sensors used as part of the system will grow in the future.

The system 100 includes a display 112, such as a plasma display or a light emitting diode (LED) display. In some embodiments, display 112 may include a touch screen or other type of device that allows a user to input data to system 100. The display 112 may be coupled to at least one circuit on substrate 108 through interconnect 130. In the example embodiment shown, the display 112 is coupled to the processor 116 though interconnect 130.

Another input device is a keypad 114. The keypad 114, in one embodiment, includes backlighting to illuminate any text, characters, or symbols included on one or more keys included in keypad 114. In various embodiments, keypad 114 may be coupled to at least one circuit on substrate 108 through interconnect 132. In various embodiments, keypad 114 may be coupled to processor 116 though interconnect 132.

The system 100 includes an input/output (I/O) connection 118 coupled to processor 116 through interconnect 136. I/O connection 118 may be any type of device used to connect processor 116 to an external device (not shown) through I/O connection 118 and interconnect 136. In some embodiments, I/O connection 118 comprises a wireless connection to communicatively couple system 100 to one or more external devices (not shown), or a network, such as the Internet. As shown in FIG. 1, the I/O connection 118 is coupled to a port 120 through a connection interconnect 138. Port 120 may be any type of port used to connect system 100 to one or more external devices (not shown) or a network, including the Internet. As shown, the I/O connection 118 is coupled to an antenna 119 to receive signals at system 100, to transmit signals from system 100, or both, perhaps using a transceiver.

In operation, the processor 116 operates using instructions to perform one or more memory operations involving memory device 160. These memory operations may include erasing portions of memory array 161, reading data from one or more portions of memory array 161, and writing data to memory array 161. In various embodiments, one or more of these or any other memory operation are performed on groups of erase blocks. In some embodiments, the memory support circuitry 164 operates in conjunction with processor 116 to control the memory operations being performed on memory array 161.

Interconnects 130, 132, 134, 136, 138, 143, and 163 may be any type of interconnect, including but not limited to physical conductors including individual wires and cables, conductive traces on a substrate, transmission lines, optical transmission cables, and wireless connections.

In operation, the system 100 receives light or other electromagnetic radiation as an image or series of images through lens 154. The lens 154 provides the incident images to sensor 101, which in turn outputs electronic signals representing the images recorded by sensor 101. The pixels within sensor 101 may be individually read, and the resulting signals can be processed by image sensor 103 to produce at least one electrical representation of the incident image. Control and processing of the electrical representation of the recorded image or images may be controlled by the sensor support circuitry 144 included in image sensor 103. In some embodiments, control and processing of the image or images may be influenced by control signals provided by processor 116. In various embodiments, the image or images provided by image sensor 103 may be stored in memory array 161.

At least one image provided by image sensor 103 may be displayed on display 112. The at least one image provided by image sensor 103 may be transmitted though I/O connection 118 to another device (not shown). Transmitting images provided by image sensor 103 may include emailing them to another device or broadcasting the image. In various embodiments, an image provided by image sensor 103 may have additional information added to the image, such as text information or other images or symbols or graphics superimposed on the image provided by the image sensor 103. The text information added to the image provided by image sensor 103 may be entered by a user through keypad 114, or through display 112. In various embodiments, text information added to the image provided by image sensor 103 is received through I/O connection 118, such as the text being received as an email. Any one or all of the memory array 161, the memory 165, the memory support circuitry 164, the processor 116, or the memory 117 associated with the processor may use an internal clock that is generated from an external clock. Any one of these devices places large amounts of data related to the pixels onto various interconnects or retrieve large amounts of data from the interconnects. Timing is critical to these various operations. As shown in FIG. 1, the memory support circuitry 164 includes an external to internal clock apparatus 200. Of course, similar external to internal clock generators may be used in other areas of the system 100. It should also be noted that system 100 is one example application of the clock apparatus 200 and that this clock apparatus 200 could be used in a multitude of other applications.

Figure 2:
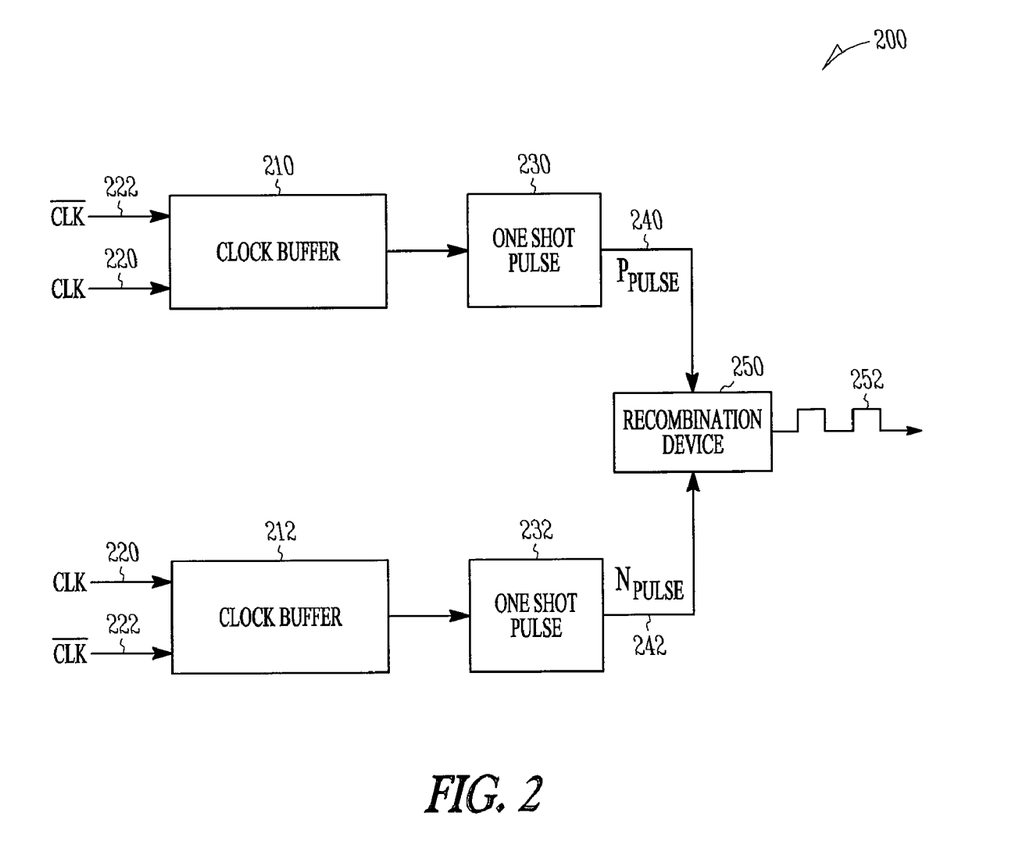
FIG. 2 is a schematic diagram of a clocking system device for converting external clock signals to an internal clock signal, according to an example embodiment.

FIG. 2 is a schematic diagram of a clocking system device for converting an external clock signal to internal clock signal 200 according to an embodiment of the invention. The external to internal clock apparatus 200 includes a first clock buffer 210 and a second clock buffer 212. The first clock buffer 210 includes substantially the same circuitry as the second clock buffer 212. In this way, the delays to a clock signal input to the first clock buffer 210 and the second clock buffer 212 caused by the clock signal passing through each of the first clock buffer 210 and second clock buffer 212 will be approximately the same. In this particular embodiment of the invention, a first external clock signal 220, designated CLK, and a second external clock signal 222, designated $\overline{\text{CLK}}$ are input to the first clock buffer 210 and the second clock buffer 212. The second external clock signal 222 is shifted in phase from the first external clock signal 220. Any phase shift can be employed. In the embodiment shown, the phase difference between the first external clock signal 220 and the second external clock signal 222 is 180 degrees.

Attached to the first clock buffer 210 is a first one-shot pulse generator 230. Attached to the second clock buffer 212 is a second one-shot pulse generator 232. As mentioned before, the first clock buffer 210 and the second clock buffer 212 are made with substantially the same circuitry. It has been observed that on the rising edge of the external clock signals 220, 222, the propagation delays are more consistent than when compared to other portions of an external clock signal. As a result, the rising edges of the first external clock signal 220 and the second external clock signal 222 are used to produce an internal clock signal. In some embodiments, other portions of the external clock signal 220, 222 could be used. It should be noted that the first clock may be a single input signal or a differential input combination of the first and second clocks into the input buffer. Therefore, on the rising edge of the first clock signal 220, the first one-shot pulse generator 230 produces a first pulse 240, designated the PPulse. On the rising edge of the second clock signal 222, the second one-shot pulse generator 232 produces a second pulse 242, designated the NPulse. In one embodiment of the invention, the first pulse 240 (PPulse) and the second pulse 242 (NPulse) each have a shorter high time than the time difference corresponding to the difference in phase between the first clock signal 220 and the second clock signal 222. The device also includes a recombination device 250 that produces an internal clock signal based on the first pulse 240 (PPulse) and the second pulse 242 (NPulse). The recombination device 250 includes latching circuitry. The latching circuitry can be a latch or can be accomplished using a number of multiplexer (MUX) devices. The first pulse 240 (PPulse) pulls an internal clock signal high and the latching circuitry keeps it there until the next pulse, in this case the second pulse 242 (NPulse), pulls the internal clock signal low. The internal clock signal stays low until the arrival of the next pulse, another first pulse 240 (PPulse) that pulls the internal clock signal high and keeps it there until the arrival of another second pulse 242 (NPulse), which again pulls the internal clock signal to a low state. The process of producing the first pulse 240 (PPulse) and the second pulse 242 (NPulse) repeats as long as the first external clock signal 220, designated CLK, and the second external clock signal 222, designated $\overline{\text{CLK}}$, are input to the first clock buffer 210 and the second clock buffer 212. The output from the recombination device 250 is a single ended internal clock signal 252.

A clock generator includes a first clock buffer 210 having an output, a first one-shot pulse generator 230 attached to the first clock buffer 210, a second clock buffer 212 having an output, and a second one-shot pulse generator 232 attached to the second clock buffer 212. The output from first clock buffer 210 triggers a first signal 240 from the first one-shot pulse generator 230 to pull an internal clock signal 252 up, and the output from the second clock buffer 212 triggers a second signal 242 from the second one-shot pulse generator 232 to pull an internal clock signal 252 down. The first clock buffer 210 is substantially identical to the second clock buffer 212. There is a phase difference between the output of the first clock buffer 210 and the output of the second clock buffer 212. The phase difference corresponds to a duty cycle time of an external clock signal 220, 222. The external to internal clock apparatus 200 also includes a circuit for combining the output from the first one-shot pulse generator and the second one-shot pulse generator to produce the internal clock signal 252. A first external clock signal 220 is placed into the first clock buffer 210, and a second external clock signal 222 is placed into the second clock buffer 212, the second external clock signal 222 in phase relation to the first external clock signal 220. The first one-shot pulse generator 230 triggers on a rising pulse of the first external clock signal 220 from the first clock buffer 210, and the second one-shot pulse generator 232 triggers on a rising pulse of the second external clock signal 222 from the second clock buffer 212. In one embodiment, the circuit for combining further comprises a latch for holding the internal clock signal in a high state in response to the first pulse 240 from the first one-shot pulse generator 230, and for holding the internal clock signal 252 in a low state in response to the second pulse 242 from the second one-shot pulse generator 232. In another embodiment, the circuit for combining further comprises a MUX enabled to hold the internal clock signal 252 in a high state in response to the first pulse 240 from the first one-shot pulse generator 230, and to hold the internal clock signal 252 in a low state in response to the second pulse 242 from the second one-shot pulse generator 232.

By using two clock buffers with two inputs that are out of phase, such as by 180 degrees, then the rising edge of clock through the first buffer and the rising edge of $\overline{\text{CLK}}$ through the second buffer will both have the same delay, preserving the 180 degree phase relationship. Furthermore, these two signals CLK and $\overline{\text{CLK}}$ can be used by both buffers as differential inputs, with the first buffers connections being swapped compared to the second buffers connections. Even though inputs to a single buffer might be differential, the internal analog circuits will still have different propagation delays depending on CLK input switching in the high direction, or the CLK input switching in the low direction.

Figure 3:
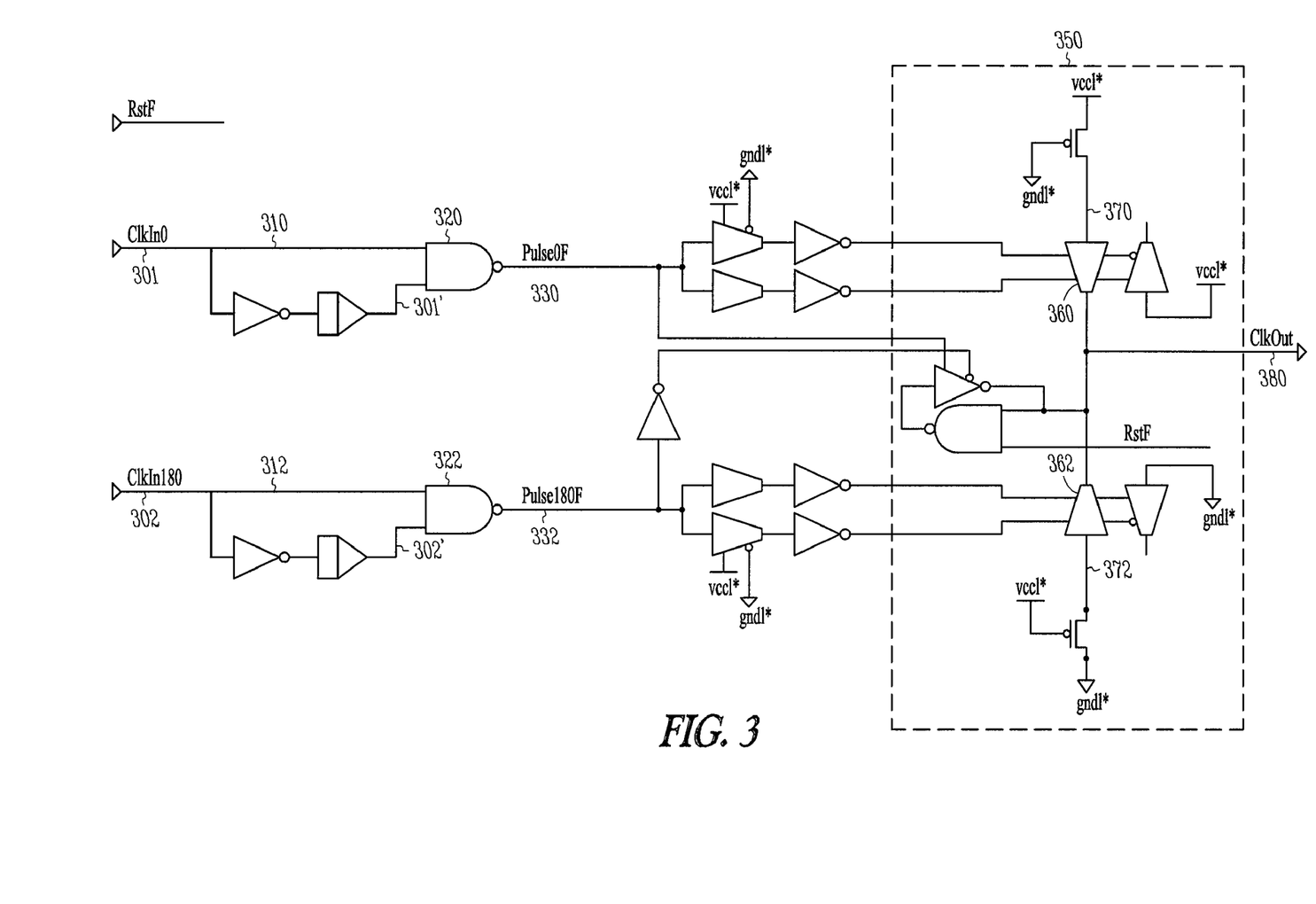
FIG. 3 is a schematic circuit diagram of an example embodiment of a clocking system.

FIG. 3 is a schematic circuit diagram of an example embodiment of a clocking system shown schematically in FIG. 2, according to one embodiment of the invention. The clocking system 300 includes a first delay circuit 310 and a second delay circuit 312. The first delay circuit 310 and the second delay circuit 312 are substantially identical so as to produce substantially identical delays in the inputs to the delay circuits 310, 312. As shown in FIG. 3, there are two clock signals input to the circuit 300. The first clock input 301 is labeled ClkIn0. The second clock input 302 is labeled ClkIn180. The second clock input 302 is 180 degrees out of phase when compared to the first clock input 301. The first clock input 301 is input to the first delay circuit 310 and to a NAND gate 320. The output of the delay circuit 310 is a delayed clock signal 301' that is also input to the NAND gate 320. On a rising clock signal, the NAND gate 320 produces a first pulse 330 when the clock signal 301 rises and the delayed clock signal 301' is still high. Similarly, the second clock input 302 is input to the second delay circuit 312 and to a NAND gate 322. The output of the delay circuit 312 is a delayed clock signal 302' that is also input to the NAND gate 322. On a rising clock signal, the NAND gate 322 produces a second pulse 332 when the clock signal 302 rises and the delayed clock signal 302' is still high. The second pulse 332 is 180 degrees out of phase with respect to the first pulse 330. Both the first pulse 330 and the second pulse 332 pass through phase splitters and drivers and are then input to circuitry 350 for recombining the first pulse 330 and the second pulse 332 into an internal clock signal. The circuitry 350 is bounded by a dashed line in FIG. 3. The circuitry 350 includes a first multiplexer 360 communicatively coupled to an up rail 370 for producing a signal in an up state, and a second multiplexer 362 communicatively coupled to a down rail 372 for producing a signal in a second state. The multiplexers 360, 362 are devices that select one of many data sources and output that source into a single channel. The multiplexers 360, 362 function as multiple-input, single-output switches. As shown, these multiplexers are pass gates that are in pairs. As a pair, the pass gates behave as a single multiplexer that selects between two inputs with one output. The up rail 370 will pull an output signal 380 high and the down rail 372 will pull the output signal 380 low through the multiplexers 360, 362, respectively. The output signal 380 represents a clock signal that has been converted from an external clock signal to an internal clock signal. The internal clock signal 380, with minimal duty cycle distortions, is ready for use in a variety of environments that might include high frequency, low voltage, low pin count, and the like.

Figure 4A:
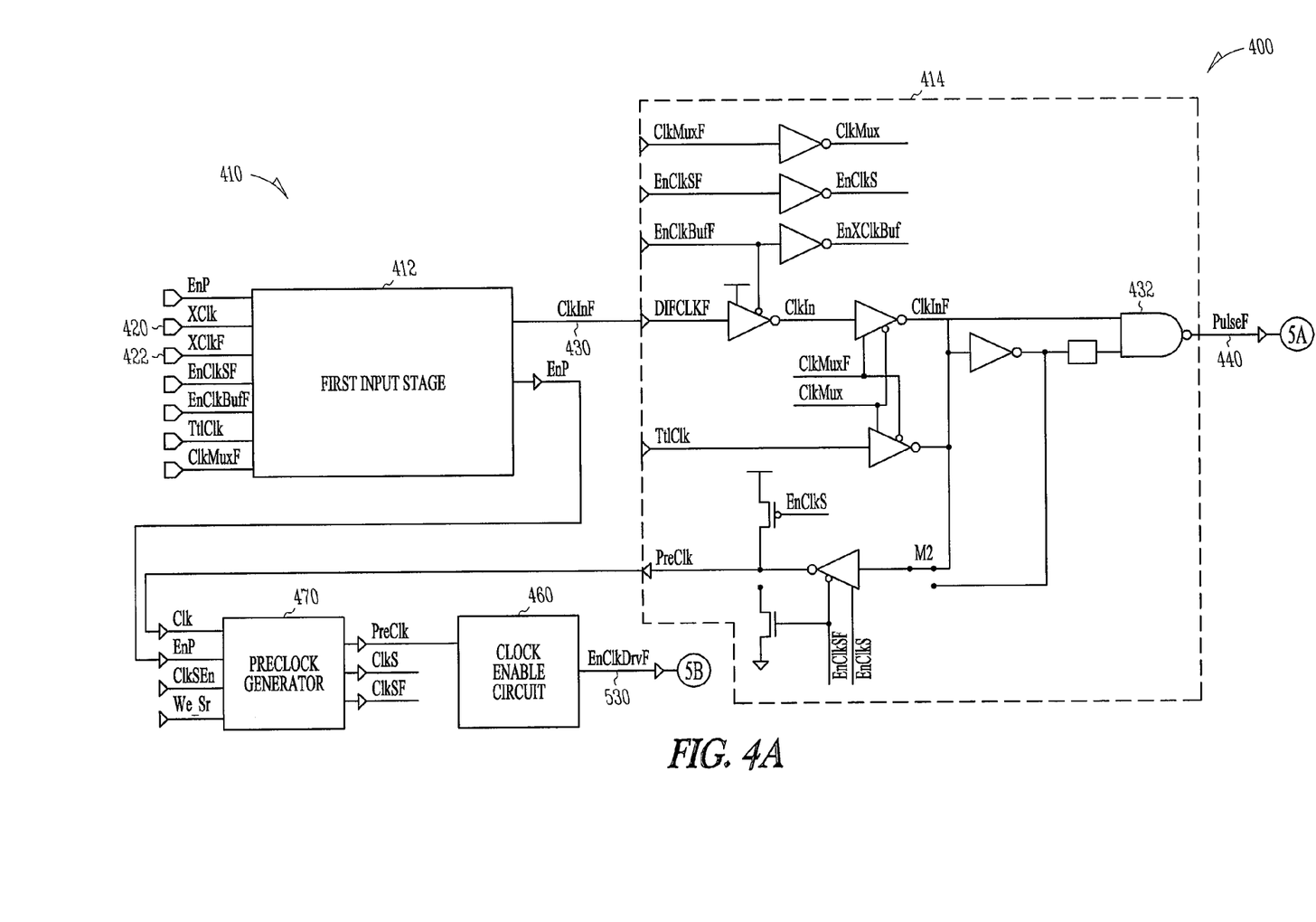
FIG. 4A is a schematic circuit diagram of a portion of another example embodiment of a clocking system.
Figure 4B:
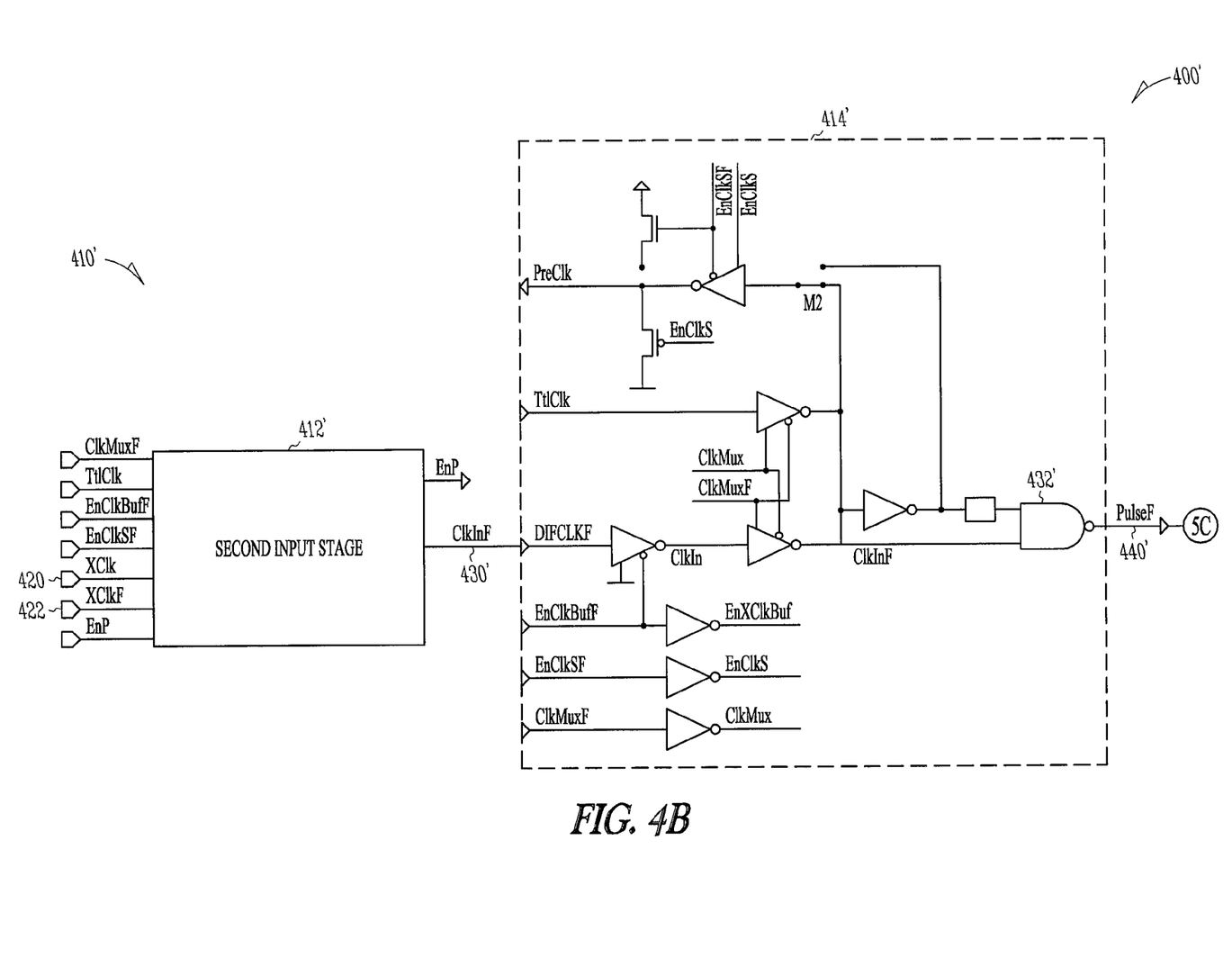
FIG. 4B is a schematic circuit diagram of another portion of another example embodiment of a clocking system.
Figure 5:
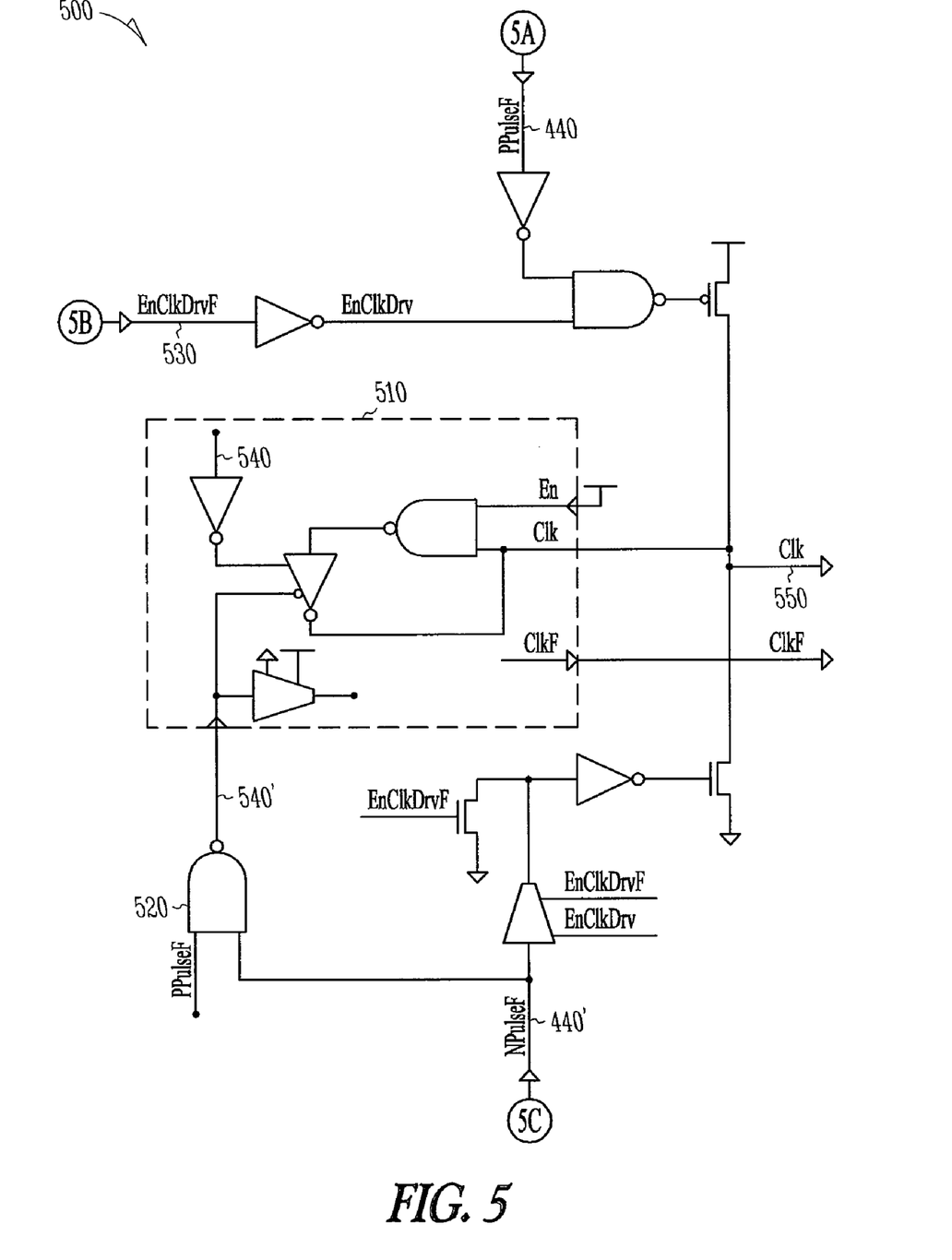
FIG. 5 is a schematic diagram of the mixer and clock driver portion of the clock system, according to an example embodiment.

FIGS. 4A and 4B is a schematic circuit diagram of a portion of another example embodiment of a clocking system 400. FIG. 5, which is also detailed below, is a schematic diagram of the mixer and clock driver portion 500. FIGS. 4A, 4B, and 5 combined form the embodiment of the clocking system 400. The clocking system 400 is a more detailed embodiment of the clocking system shown in FIG. 2. Now, turning back to FIGS. 4A, 4B, and 5 the clocking system 400 will be further detailed. The clocking system 400 includes a first input portion 410 that includes an input stage 412 and a one-shot pulse portion 414. The first portion is also labeled as CKT1. The input stage 412 can also be called a clock buffer. The clocking system 400 also includes a second input portion 410' that includes an input stage 412' and a one-shot pulse portion 414'. The second input portion 410' is substantially the same as the first input portion 410. By having substantially the same circuitry, the delays associated with passing clocking signals through the first input portion 410 and the second input portion 410' will also be substantially identical. An external clocking signal (XClk) 420 and a phase-delayed external clocking signal (XClkF) 422 are input to the first input portion 410. The same signals XClk 420 and XClkF 422 are also input to the second input portion 410'. The signals XClk 420 and the XClkF 422 are reversed or input to the opposite inputs at the second input portion 410' when compared to the inputs to the first portion 410. As a result, the XClkF 422, or phase-shifted clock signal, will be the signal that dictates when a pulse is produced. The amount of phase shift is variable. In one embodiment, the phase shift is 180 degrees so as to produce a 50/50 duty cycle, where the output clock is in a high state for 50% of the time and in a low state for 50% of the time.

One of the outputs from the first input stage 412 is the buffered signal XClk 420. The buffered clock signal is labeled Clkinf and has the reference number 430. The buffered XClk 420 or Clkinf 430 signal is input to a NAND gate 432 in the one-shot portion 414. Prior to the NAND gate 432, circuitry is provided that adds a delay to the signal. The NAND gate 432 produces a pulse 440 having a time approximately equal to the delay. The pulse 440 is output from the one-shot portion 414 and from the first input portion 410.

One of the outputs from the second input stage 412' is the buffered signal XClkF 422. The buffered clock signal is labeled Clkinf and has the reference number 430'. The buffered XClkF 422 or Clkinf 430' signal is input to a NAND gate 432' in the one-shot portion 414'. Prior to the NAND gate 432', circuitry is provided that adds a delay to the signal. The NAND gate 432' produces a pulse 440' having a time approximately equal to the delay. The pulse 440' is output from the one-shot portion 414' and from the second input portion 410'.

The first input portion 410 also includes a test clock input (TclkF) 418. The test clock input 418 is for placing test clock signals into the clocking system 400, and specifically into the input portion 410. The second input portion 410' also includes a test clock input (TclkF) 418'. The test clock input 418' is for placing test clock signals into the clocking system 400' and specifically into the second input portion 410'.

The clocking system 400 also includes a mixer and clock driver portion 500. The mixer and clock driver portion 500 acts in response to the pulses 440 and 440' to produce an internal clock for a device, such as a low power device. The mixer and clock driver portion 500 further details an embodiment of the one shots 230, 232 and the recombination device 250 of FIG. 2.

The clocking system 400 also includes a preclock generator 460 for the control logic of the clocking system, and an enable circuit 470. The preclock generator 460 generates signals to set the logic associated with the clocking system 400 into a state where the logic can receive the external clocking signals, namely XClk 420 and XClkF 422, and can perform in the desired manner as discussed above. The enable circuit 470 includes a series of latches that produce an output 530 EnClkDrvF, (also shown in FIG. 5) for enabling the clock driver in the mixer and clock driver portion 500 of the clocking system 400.

FIG. 5 is a detailed schematic diagram of the mixer and clock driver portion 500. The pulse 440, which is also labeled PPulseF, is one input to the mixer and clock portion 500. The pulse 440' is which is also labeled NPulseF. The pulse 440 (PPulseF) and the pulse 440' (NPulseF) are out of phase and cannot overlap. The pulse 440 (PPulseF) pulls the clock output signal 550 (Clk) high. The mixer and clock driver portion 500 includes a latching mechanism 510. In one embodiment, the latching mechanism includes latching circuitry. When the pulse 440 (PPulseF) pulls the output clock signal 550 (Clk) high, the latching mechanism 510 keeps it in a high state until a pulse 440' (NPulseF) is input to the mixer and clock driver portion 500. The pulse 440' (NPulseF) pulls the output clock signal 550 (Clk) to a low state. The latching mechanism 510 acts to keep the output clock signal 550 (Clk) in a low state until another pulse 440 (PPulseF) is detected. There are some timing concerns since the pulses 440 and 440' fight the latching mechanism 5 10 to change the state of the latch temporarily. The pulse 440 (PPulseF) comes in quickly to cut off the latch associated with the latching mechanism 5 10 so that the feedback does not counteract the pull up of the output clock signal 550 (Clk). In other words, the pulse 440 (PPulseF) disables the latching mechanism 5 10 at a gate. The output clock signal floats for a short time before being pulled up so as to prevent any resistance from the latching mechanism 510 to pulling up the output clock signal 550 (Clk). The pulse 440 (PPulseF) is input to a gate 520 to disable the latching mechanism 510. In some embodiments, a signal 440' (NPulseF) is also used to disable the latching mechanism 510 before the output clock signal 550 (Clk) is driven low.

Figure 6:
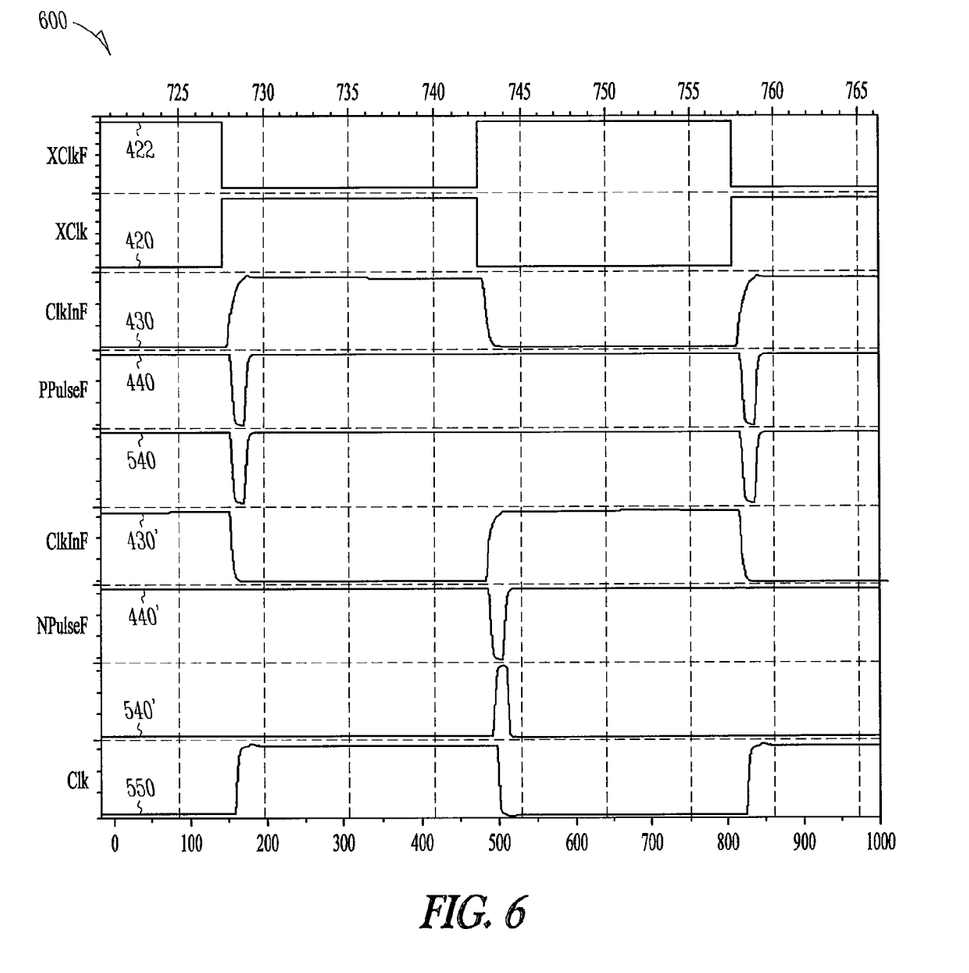
FIG. 6 is a timing diagram of signals associated with the clocking system shown in FIGS. 4A, 4B and 5, according to an example embodiment.

FIG. 6 is a timing diagram 600 of signals associated with the clocking system 400 shown in FIGS. 4 and 5, according to an example embodiment. The timing diagram 600 includes the external clock signal 420 (XClk) and the external clock signal 422 (XClkF). The external clock signal 422 (XClkF) is inverted and phase-shifted with respect to the external clock signal 420 (XClk). The amount of phase-shifting can be any amount as long as the resulting pulses formed do not overlap. In this particular case, the external clock signal 422 (XClkF) is phase-shifted by 180 degrees with respect to the external clock signal 420 (XClk). This results in an internal clock having a 50/50 duty cycle. In this particular application, the external clock signal 420 (XClk) also has a 50/50 duty cycle and it is desired to replicate the duty cycle of the external clock signal 420 (XClk) with the resulting internal clock signal 550 (Clk). In other applications, the amount of phase-shifting could be changed to produce a different duty cycle. Now referring to FIGS. 4-6, one of the outputs of the first input stage 412 is the buffered clock signal 430 (Clkinf) which has a rise that begins at substantially the same time as the rise in external clock signal 420 (XClk). The buffered clock signal 430 (Clkinf) is an input to the one-shot pulse generation portion 414 and specifically to the NAND gate 432. The NAND gate 432 includes a delayed Clkinf which is also input to the NAND gate 432. The length of the delay dictates the width of the pulse signal 440 (PPulseF) that is formed. The pulse signal 440 (PPulseF) is input to the mixer and clock driver portion 500 of the clocking system 400.

Similarly, the external clock input 422 (XClkF) and the external clock input 420 (XClk) are input to the second input stage 412'. The second input stage 412' buffers the external clock input 420 and outputs the buffered clock signal 430' (Clkinf signal associated with the second input stage 412') which has a rise that begins at substantially the same time as the rise in external clock signal 422 (XClkF). The buffered clock signal 430' (Clkinf) is an input to the one-shot pulse generation portion 414' and specifically to the NAND gate 432'. The NAND gate 432' includes a delayed Clkinf which is also input to the NAND gate 432'. The length of the delay dictates the width of the pulse signal 440' (NPulseF) that is formed. The pulse signal 440' (NPulseF) is input to the mixer and clock driver portion 500 of the clocking system 400. As can be seen, the pulse signal 440' (NPulseF) is also 180 degrees phase-shifted with respect to the pulse signal 440 (PPulseF). The pulse signal 440 (PPulseF) and the pulse signal 440' (NPulseF) are input to the latching mechanism 510. The pulse signal 440 (PPulseF) and the pulse signal 440' (NPulseF) produce drive signal 540 and drive signal 540', respectively. The drive signal 540 and drive signal 540' drive the latching mechanism 510 between a high state and a low state, respectively. The latching mechanism 510 holds the latched state until a subsequent pulse is received or input to the latching mechanism 510. The latching mechanism causes the output (which is the internal clock signal 550) to alternate between a high state and a low state. The output or clock signal 550 replicates the external clock signal XClk 420 which is input to the clocking mechanism 400. The latching mechanism 510 converts the pulses into a clock signal 550 since it holds the current state (high or low) until the next pulse is received. The clocking mechanism 400 produces pulses based on when the external clock signal 420 (XClk) rises and on when the external clock signal 422 (XClkF) rises. Since one buffer uses the opposite polarity inputs as the other input buffer basing the pulses on the rise times is more reliable than basing the pulses on other times associated with the external clock signals. In one embodiment, the signal 540 is the output of the NAND gate driving a P channel device, and signal 540 is the output of the inverter driving an N channel device. These signals "recombine" to generate signal 550 which is the Clk.

The variation in duty cycles between an external clock signal, such as external clock signal 420 (XClk) and a generated internal clock signal, such as internal clock signal 550 (Clk), is small. Table 1 compares the variation in duty cycle clock of a previous clocking system with the variation in duty cycle of the clocking system associated with FIGS. 2-5, under normal operating conditions. Table 2 compares the variation in duty cycle clock of a previous clocking system with the variation in duty cycle of the clocking system associated with FIGS. 2-5, under extreme process variations. In each case, an embodiment of the NEW circuit is used to produce duty cycle performance data based on a simulation. This is compared to a simulation of an OLD circuit using the same simulation. The simulations are run, in each case, using the same PVT conditions for both circuits so that the data generated can be compared on an apple-to-apple basis. The simulators used are either a Hierarchical Storage and Isomorphic Matching (HSIM) or a Hailey Simulation Program with Integrated Circuit Emphasis (HSPICE) simulator, both of which are available from Synopsys, Inc. of Mountainview, Calif.

TABLE 1

| PVT Variations | OLD clock duty cycle delta | NEW clock duty cycle delta |
|---|---|---|
| SS, 1.6 V, 110 c | +/−180 ps | +/−5 ps |
| TT, 1.8 V, 25 c | +/−90 ps | +/−3 ps |
| FF, 2.0 V, 0 c | +/−65 ps | +/−7 ps |

Table 2 shows the comparison data at the extremes, where P can be weak and N can be strong or vice versa. Even at these conditions, the new scheme still prevails over the old scheme. It is easier to make timing adjustments for setup and hold when clock duty cycle distortion is small.

TABLE 2

| PVT Variations | OLD clock duty cycle delta | NEW clock duty cycle delta |
|---|---|---|
| FS, 1.6 V, 110 c | +/−150 ps | +/−12 ps |
| SF, 1.6 V, 110 c | +/−180 ps | +/−8 ps |
| FS, 1.8 V, 110 c | +/−101 ps | +/−12 ps |
| SF, 1.8 V, 25 c | +/−92 ps | +/−5 ps |
| FS, 2.0 V, 0 c | +/−66 ps | +/−15 ps |
| SF, 2.0 V, 0 c | +/−70 ps | +/−3 ps |

Figure 7:
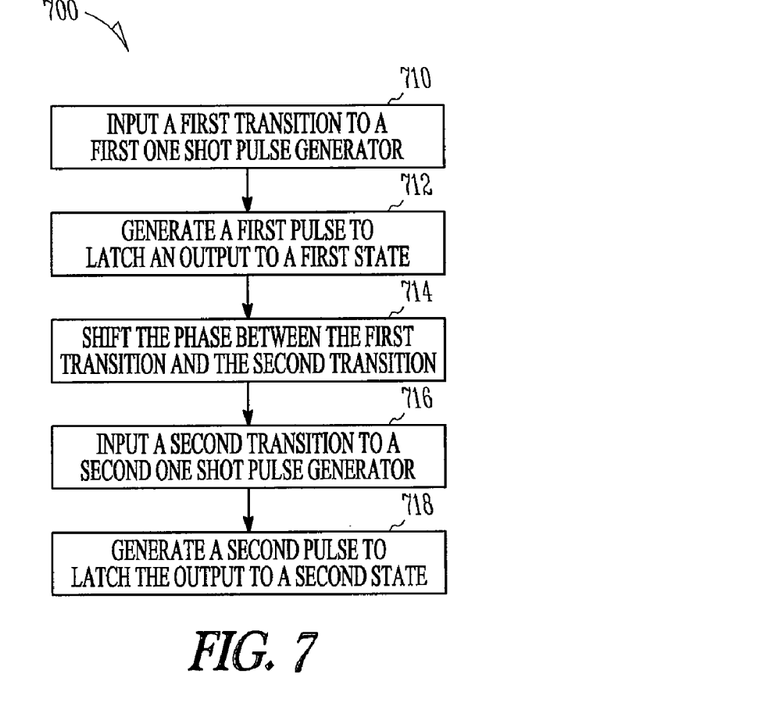
FIG. 7 is a flow chart of a method of generating an internal clock signal from an external clock signal, according to an example embodiment.

FIG. 7 is a flow chart of a method 700 of generating an internal clock signal from an external clock signal, according to an example embodiment. The method 700 of generating an internal clock signal from an external clock signal includes inputting a first transition to a first one-shot pulse generator 710, the first buffer generating a first pulse to latch an output to a first state 712, and inputting a second transition to a second one-shot pulse generator 716, the second buffer generating a second pulse to latch the output to a second state 718. The method 700 also includes shifting the phase between the first transition and the second transition 714. The first pulse is generated 712 and the second pulse is generated 718 from the same portion of the first transition and the second transition. In one embodiment, the first pulse is generated 712 and the second pulse is generated 718 from a rising portion of the first transition and a rising portion of the second transition. The circuitry of the first buffer and the circuitry of the second buffer are substantially the same. In one embodiment, the first transition is an external clock signal and the second transition is an external clock signal that is phase-shifted from the first transition. The latched output forms an internal clock. In some embodiments, the latched output forms an internal clock having a duty cycle related to the phase shift between the first transition and the second transition. In still other embodiments, the second transition is substantially 180 degrees out of phase from the first transition. In one embodiment, the first buffer generates the first pulse from a first one-shot pulse generator, and the second buffer generates the second pulse from a second one-shot pulse generator. In operation, the first state is maintained until a second pulse is detected and the second state is maintained until a first pulse is detected. In one embodiment, the first pulse and the second pulse have a high state that is shorter than the time associated with the phase difference between the first transition and the second transition.

Figure 8:
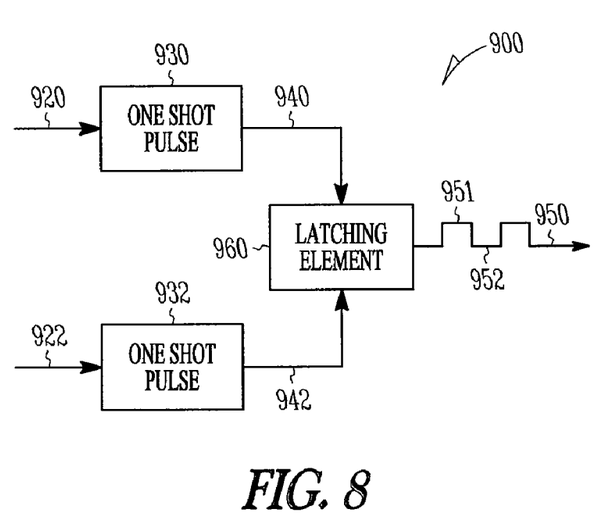
FIG. 8 is a schematic diagram of a device for recombining phase offset signals, according to an example embodiment.

FIG. 8 is a schematic diagram of a device 900 for recombining phase offset signals, according to an example embodiment. The phase recombination device 900 is a circuit that includes a first phase input 920 to a first one-shot pulse generator 930. The first one-shot pulse generator 930 produces a first pulse signal 940 in response to the first phase input 920. The first pulse signal 940 pulls a signal 950 to a first state 951. The phase recombination device 900 also includes a second phase input 922 in phase relationship with the first phase input 920, and a second one-shot pulse generator 932. The second one-shot pulse generator 932 produces a second pulse signal 942 in response to the second phase input 922. The second pulse signal pulls a signal 950 to a second state 952. The phase difference between the first phase input 920 and the second phase input 922, in one embodiment, corresponds to a duty cycle time of an external clock signal. In one embodiment, the recombination device 900 operates in a low voltage environment, such as 0 to 0.5 volts. In still another embodiment, the recombination device 900 operates in a voltage range from 0 to 5 volts. Other embodiments may cover any range of voltages. A latch element 960 is the portion of the phase recombination device 900 that holds the signal in one of a high state or a low state until another pulse is received from one of the first one-shot pulse generator 930 or the second one-shot pulse generator 932. In another embodiment, the latching is done using at least one feedback device. The pulse 940 generated by one of the first one-shot pulse generator 930 or the second one-shot pulse generator 932 has a shorter time than the time between the first phase input 920 and the second phase input 922. The output of the latching element 960 is the output signal 950 that varies between the first state 951 and the second state 952.

In still another embodiment, the one-shot pulse generators could produce a signal based on a falling signal rather than on the rising signal discussed previously.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A clock generator comprising:
   a circuit node to provide an internal clock signal;
   a first clock buffer having an output;
   a first one-shot pulse generator communicatively coupled to the first clock buffer, the first clock buffer triggering a first signal from the first one-shot pulse generator to cause the internal clock signal to make a transition from a first signal level to a second signal level;
   a second clock buffer having an output, the second clock buffer substantially identical to the first clock buffer;
   a second one-shot pulse generator communicatively coupled to the second clock buffer, the second clock buffer triggering a second signal from the second one-shot pulse generator to cause the internal clock signal to make a transition from the second signal level to the first signal level, wherein a phase difference between the output of the first clock buffer and the output of the second clock buffer corresponds to a duty cycle time of an external clock signal; and
   a circuit for combining an output from the first one-shot pulse generator and an output from the second one-shot pulse generator to produce the internal clock signal, the circuit including a first multiplexer having an output directly coupled to the circuit node and to respond to a signal from the output of the first one-shot pulse generator to cause the internal clock signal to make the transition from the first signal level to the second signal level, and the circuit further including a second multiplexer having an output directly coupled to the circuit node and to respond to a signal from the output of the second one-shot pulse generator to cause the internal clock signal to make the transition from the second signal level to the first signal level, wherein the output of the first multiplexer and the output of the second multiplexer are coupled to the circuit node at the same time.

2. The clock generator of claim 1 wherein the first one-shot pulse generator is configured to trigger on a rising pulse of a first external clock signal from the first clock buffer.

3. The clock generator of claim 2 wherein the second one-shot pulse generator is configured to trigger on a rising pulse of a second external clock signal from the second clock buffer, and the first and second external signals are 180 degrees out of phase with each other.

4. The clock generator of claim 1 wherein the combination of the first and second multiplexers is configured to operate as multiple inputs and single output switches with a first input of the multiple inputs to respond to the signal from the output of the first one-shot pulse generator and with a second input of the multiple inputs to respond to the signal from the output of the second one-shot pulse generator.

5. The clock generator of claim 1 wherein the first multiplexer includes a first passgate to cause the internal clock signal to make the transition from the first signal level to the second signal level higher than the first signal level, and the second multiplexer includes second a passgate to cause the internal clock signal to make the transition from the second signal level to the first signal level 6. The clock generator of claim 1 wherein the first clock buffer has an input from a first external clock and the second clock buffer has the input from a second external clock that is phase shifted from the first external clock.

7. A phase recombination circuit comprising:
 a first one-shot pulse generator adapted to receive a first phase input and to produce a first signal to cause a third signal at a circuit node to be in a first state;
 a second one-shot pulse generator adapted to receive a second phase input and produce a second signal to cause the third signal to be in a second state; and
 a circuit including a first multiplexer having an output directly coupled to the circuit node and to respond to the first signal from the first one-shot pulse generator to cause the third signal to be in the first state, and the circuit further including a second multiplexer having an output directly coupled to the circuit node and to respond to the second signal from the second one-shot pulse generator to cause the third signal to be in the second state, wherein the output of the first multiplexer and the output of the second multiplexer are coupled to the circuit node at the same time.

8. The phase recombination circuit of claim 7 wherein a phase difference between the first phase input and the second phase input corresponds to a duty cycle time of an external clock signal.

9. The phase recombination circuit of claim 7 wherein the phase recombination circuit is configured to operate in a voltage range from 0 to 5 volts.

10. The phase recombination circuit of claim 7 wherein a pulse generated by one of the first one-shot pulse generator and the second one-shot pulse generator has a shorter time than a time between the first phase input and the second phase input.

* * * * *

UNITED STATES PATENT AND TRADEMARK OFFICE
CERTIFICATE OF CORRECTION

| | | |
|---|---|---|
| PATENT NO. | : 7,936,199 B2 | Page 1 of 1 |
| APPLICATION NO. | : 12/027124 | |
| DATED | : May 3, 2011 | |
| INVENTOR(S) | : Michael V. Ho et al. | |

It is certified that error appears in the above-identified patent and that said Letters Patent is hereby corrected as shown below:

In column 13, line 19, in Claim 5, delete "second a passgate" and insert -- a second passgate --, therefor.

In column 13, line 21, in Claim 5, after "level" insert -- . --.

Signed and Sealed this
Twenty-eighth Day of June, 2011

David J. Kappos
*Director of the United States Patent and Trademark Office*